Jan. 14, 1941.  L. A. WESTON  2,228,291
SOLDERING TOOL
Filed Sept. 13, 1938
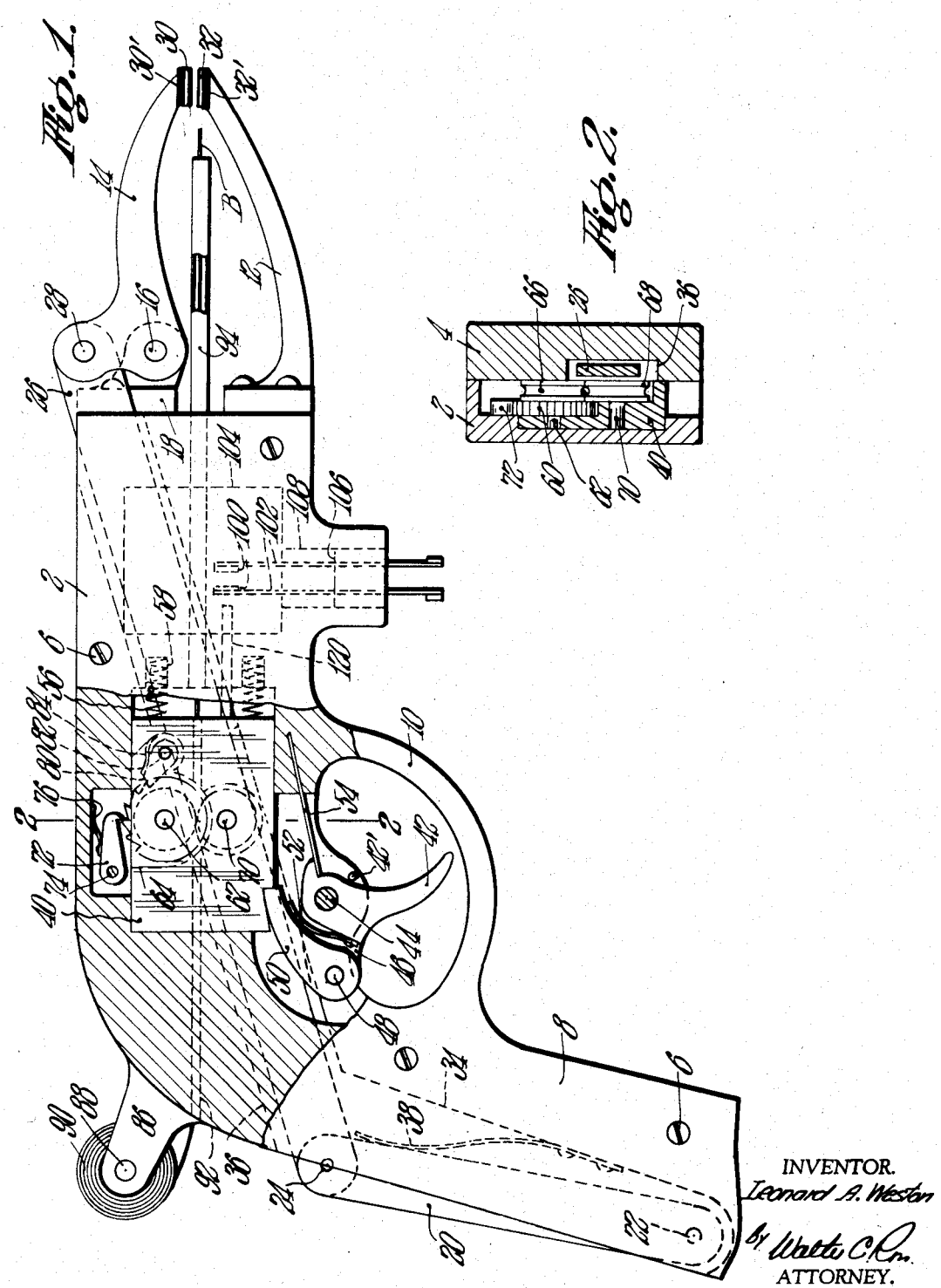
INVENTOR.
Leonard A. Weston
by Walter C. Rom
ATTORNEY.

Patented Jan. 14, 1941

2,228,291

UNITED STATES PATENT OFFICE 2,228,291

SOLDERING TOOL

Leonard A. Weston, Springfield, Mass.

Application September 13, 1938, Serial No. 229,717

7 Claims. (Cl. 219—27)

This invention relates to improvements in devices for adjoining metallic parts together.

The principal objects of this invention are directed to the provision of a device adapted to be manipulated by a single hand. The device is characterized by contact means for holding the parts to be joined in their desired relative positions in combination with means for opening and closing an electrical circuit including the contacts, and means for advancing and retracting the material for the joining operation such as soldering, welding or brazing material of various kinds.

The device of the invention is also characterized by its simplicity of form and efficiency in operation and while various changes may be made in the form thereof without departing from the spirit and scope of the invention the present preferred form is hereinafter described in connection with the accompanying drawing, wherein:

Fig. 1 is a side elevational view of a device embodying the novel features of the invention with parts in section for clearness; and Fig. 2 is a sectional elevational view on the line 2—2 of Fig. 1.

Referring now to the drawing more in detail, the invention will be more fully described.

The device of the invention in a broad way includes a pair of frame members 2 and 4 which may be held in superposed relation by any suitable means such as screws 6 or the like. The frame has a hand grip portion 8 at its lower rear side, a trigger guard 10 and at the forward end a pair of relatively movable jaws 12 and 14.

The jaw 12 is secured to the frame in any suitable manner while the jaw 14 is pivoted at 16 to a bracket 18 which is secured to the frame. A lever 20 is pivoted at 22 to the grip 8 and its upper end is pivotally connected at 24 to a link 26 which is pivoted at 28 to the upper jaw 14. As the grip of the device is grasped by the hand of the operator and squeezed, the lever 20 is depressed to swing the jaw 14 downwardly.

The jaws 12 and 14 are secured to the frame in any suitable manner but are preferably removably attached thereto so that different sizes and various types of jaws may be substituted therefor.

Contacts 30 and 32 are carried by the jaws 12 and 14 which may be connected in an electrical circuit in any desired manner.

Preferably the contacts 30 and 32 are mounted on insulating blocks such as 30' and 32'.

Recesses 34 and 36 are provided in one face of one of the frame members such as the frame 4 in which members 20 and 26 are disposed to permit movements of said members, and a spring 38 is provided in the recess 34. This spring is adapted to resist inward movements of the member 20 and to urge said member outwardly so that when released, the jaws are moved thereby to an open position.

With the objects to be joined together held or clamped between the contacts 30 and 32 of the jaws 12 and 14, and with the said contacts in a closed electrical circuit, the objects are heated. Being so held a suitable heated material may be contacted with the objects and caused to join the objects together.

The material for the joining operation may take the form of solder, or various metals adapted to brazing or welding operations. As the character of the same may vary considerably a specific metal is not mentioned, wherefore the metal is referred to as a brazing material and according to the invention is in the form of a strip or wire.

A block 40 is slidable forwardly from the position shown in Fig. 1 in a recess provided on the inner face of frame member 2. A trigger 42 is pivoted in the frame 2 at 44, and it has a rearwardly extending part 46 to which is pivoted at 48 a pawl 50. The forward end of the pawl 50 is arranged to act in a notch, as shown, in the block 40.

A spring 52 secured at one end to the trigger 42 acts on the pawl 50 and tends to cause it to swing counterclockwise relative to the trigger. A spring 54 secured in frame 2 has a free end acting on the trigger, as shown, to swing said trigger counterclockwise. A stop 42' limits movement of the trigger 42 in a counterclockwise direction.

Springs 56 in bores 58 of the frame are provided which act on the block 40 to move it rearwardly or to retract said block after it is moved forwardly by the trigger actuated pawl 50.

With the grip 8 grasped by the hand of the operator, the member 20 may be depressed so that the objects to be joined together are clamped or held between the contacts 30 and 32 and when the trigger is pulled rearwardly block 40 is advanced to the right to advance the brazing material for joining the objects.

To accomplish this a ratchet 60 is journalled at 62 for rotation in a recess 64 of block 40 and on its inner side carries a feed roll or wheel 66 which cooperates with a feed roll or wheel 68 journalled in said block at 70.

A pawl 72 is pivoted at 74 to frame part 2 and its forward end engages the teeth of the wheel 60. A spring 76 carried by the pawl abuts the upper side of a recess in the frame which is provided for the pawl, as shown. The spring tends to cause the ratchet to engage the teeth. A pawl 80 is pivoted at 82 to block 40 and also engages the teeth of the ratchet and a spring 84 associated with the pawl abuts a side of a recess in which said pawl is carried, as shown. The pawl 80 prevents clockwise rotation of the ratchet 60.

A bracket or brackets 86 are associated with one of the frames or with both, which carry an arbor 88 for a supply of brazing material which may be in the form of a coil indicated by 90. The brazing material is preferably in the form of an endless member somewhat like wire and it passes through an opening 92 of the frame between feed wheels 66 and 68 and forwardly through a guide tube 94 associated with the frame with its end extending forwardly therefrom between the jaws.

A pair of contacts 100 are associated with yieldable or flexible members 102 which are disposed in a recess 104. Said members 102 are maintained in position by a plug or block 106 of insulating material in a socket 108 as shown, and are adapted to function as a switch.

A member 120 associated with the block is slidable in the frame forwardly thereof and as the block 40 moves to the right said member 120 is adapted to engage and flex one of the members 102 to cause it to contact with the other member. The outer ends of the members 102 may be connected in an electrical circuit including contacts 30 and 32 so that when the contacts 100 are in engagement a circuit including the contacts 30 and 32 is completed.

The parts are so constructed and arranged and are so related that the device operates generally in the following manner.

The grip is embraced by the hand of the operator and squeezed so that member 20 is depressed, actuating jaw 14 whereby the contacts 30 and 32 embrace the parts which are to be joined together.

It will be understood that the contacts 30 and 32 are according to the invention electrically connected in a circuit which includes members 102 which function as a switch in the circuit so that when contacts 100 are in engagement the circuit including contacts 30 and 32 is inclosed.

With the grip embraced as stated so that the parts to be joined are clamped, the trigger 42 is actuated clockwise to cause block 40 to be moved to the right. The curvature at the upper side of pawl 50 is such that it brings up against the lower side of the notch in block 40 to move pawl 50 out of said notch, whereupon springs 56 move the block 40 rearwardly or to the left. As the block 40 is moved forwardly by the trigger the ratchet wheel 60 is moved counterclockwise to cause rotation of wheels 66 and 68 in a feeding direction.

The forward movement of the block 40 carries the leading or forward end B of the brazing material toward the objects between the contacts 30 and 32 while the counterclockwise movement of the ratchet causes the brazing material to be fed forwardly relative to the block. Thus the brazing material is fed forwardly for a brazing operation, is retracted and the material advanced for a subsequent operation.

As the forward end B of the brazing material is advanced against or adjacent the objects between the contacts 30 and 32 the rod 110 causes one contact 100 to be brought into engagement with the other contact 120 to close the circuit in which the contacts 30 and 32 are included whereby contacts are heated to heat the objects therebetween, the adjacent portion of the brazing material is melted and the objects are joined together.

As before stated, when the block has been moved to a certain position the pawl 50 becomes disengaged therefrom and this occurs after the contacting of the contacts 100 and the brazing operation. Then, by releasing the trigger 42, spring 54 returns the trigger to the position shown in Fig. 1 whereupon pawl 50 again engages the notch thereof.

According to the invention it is desired to have the parts so arranged that the device performs successive related steps. That is, the objects are clamped between the contacts, the welding, brazing or soldering material is fed forwardly thereto, the contacts are heated to heat the objects and material and then the material is withdrawn from the proximity of the objects being joined.

As previously stated the device is adapted for brazing, welding, soldering and other operations for joining metal objects or parts together wherefore the material for the joining operation may take various forms according to the purpose intended.

While I have described the invention in great detail and with respect to the present preferred form thereof, it is not desired to be limited thereto since many changes and modifications may be made therein without departing from the spirit and scope of the invention.

What it is desired to claim and secure by Letters Patent of the United States is:

1. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, and connections between said feeding means and trigger whereby the former is actuated by the latter.

2. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, connections between said feeding means and trigger whereby the former is actuated by the latter, and circuit opening and closing means carried by the frame operable by said feeding means.

3. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, connections between said feeding means and trigger whereby the former is actuated by the latter, the feeding means including a member reciprocable in said frame having coacting feed rolls for engaging said brazing material and means to rotate one of said rolls when the reciprocable member moves in one direction.

4. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, connections between said feeding means and trigger whereby the former is actuated by the latter, the feeding means including a member reciprocable in said frame having coacting feed rolls for engaging said brazing material and means to rotate one of said rolls when the reciprocable member moves in one direction, consisting of a ratchet associated with said roll and a spring pressed pawl on said frame.

5. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, and connections between said feeding means and trigger whereby the former is actuated by the latter, said connections including a member pivoted to said trigger engageable with said feeding means.

6. A device of the class described comprising in combination, a frame having a hand grip, relatively movable jaws on said frame having contacts for embracing objects to be joined together, means for supporting a supply of brazing material in strip form, means for guiding said material so that its end lies adjacent said contacts, an actuating member depressible in said grip when the grip is embraced in the hand and connections between said member and one of said jaws, a trigger pivoted in said frame, feeding means engaging said strip material adapted to alternately feed the same forwardly relative to said contacts and retract the same, connections between said feeding means and trigger whereby the former is actuated by the latter, the feeding means including a member reciprocable in said frame having coacting feed rolls for engaging said brazing material and means to rotate one of said rolls when the reciprocable member moves in one direction, said connections including a member pivoted to said trigger engageable with the reciprocable member of said feeding means.

7. A device of the class described comprising in combination, a frame having a grip adapted to be grasped by the hand, a stationary jaw on said frame and a jaw pivoted for swinging movements relative thereto, contacts on said jaws for engaging objects to be joined, a member depressably mounted in said grip, connections between said member and pivoted jaw, a trigger pivoted in said frame, relatively movable electrical contacts in said frame, a block slidable back and forth in said frame, means to urge said block in one direction, means associated with said trigger and block whereby the latter may be moved in an opposite direction by movement of said trigger, rolls on said block for engaging a strip of brazing material to advance and retract said material as said block moves in opposite directions, and means to move one of said rolls as the block moves in one direction to advance said material relative to said block.

LEONARD A. WESTON.